(12) United States Patent
Guan et al.

(10) Patent No.: US 11,098,843 B1
(45) Date of Patent: Aug. 24, 2021

(54) DEVICE FOR FIXING CYLINDER

(71) Applicant: Dalian University of Technology, Dalian (CN)

(72) Inventors: Guan Guan, Dalian (CN); Kaimeng He, Dalian (CN); Qu Yang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/882,729

(22) Filed: May 25, 2020

(30) Foreign Application Priority Data

Mar. 21, 2020 (CN) .......................... 202010204557.2

(51) Int. Cl.
| | | |
|---|---|---|
| *E04H 12/22* | (2006.01) | |
| *F16M 13/02* | (2006.01) | |
| *F16H 1/20* | (2006.01) | |
| *B26D 7/04* | (2006.01) | |
| *B23B 31/12* | (2006.01) | |

(52) U.S. Cl.
CPC ............. *F16M 13/02* (2013.01); *B23B 31/12* (2013.01); *B26D 7/04* (2013.01); *E04H 12/22* (2013.01); *F16H 1/20* (2013.01); *F16M 2200/022* (2013.01)

(58) Field of Classification Search
CPC .............. F16M 2200/022; E04H 12/22; Y10T 279/17717; B26D 7/04; B23B 31/12
USPC ........ 248/523, 113, 314; 279/71, 33, 35, 60, 279/66
See application file for complete search history.

(56) References Cited

U.S. PATENT DOCUMENTS

| | | | | |
|---|---|---|---|---|
| 149,991 | A * | 4/1874 | Clever | ................ B23B 31/1261 279/33 |
| 988,302 | A * | 3/1911 | Blomberg | ........... B23B 31/1261 279/33 |
| 1,429,396 | A * | 9/1922 | Barker | ............. B23B 31/16004 279/114 |
| 1,838,714 | A * | 12/1931 | Stevens | ............. B23B 31/16004 279/116 |
| 1,846,382 | A * | 2/1932 | Bing | .................... F16M 11/041 248/187.1 |
| 2,207,525 | A * | 7/1940 | Stoner | ................. B23B 31/1261 279/33 |
| 2,290,731 | A * | 7/1942 | Blazek | ................ B23B 31/1284 279/33 |
| 3,995,869 | A * | 12/1976 | Mazingue | ........... B23B 31/1261 279/33 |

(Continued)

*Primary Examiner* — Bradley Duckworth
(74) *Attorney, Agent, or Firm* — Matthias Scholl P.C.; Matthias Scholl (57) ABSTRACT

A device for fixing a cylinder, the device including a first outer casing; a rotatable inner casing; a second outer casing; a plurality of curved blades; and at least one transmission. The second outer casing is in threaded connection to the first outer casing, and includes a first bearing, a second bearing, a third bearing, a first division plate including a first through hole and a first arc groove, and a second division plate including a second through hole and a second arc groove. Each curved blade includes a first connection rod having a ball head, a second connection rod pivotally connected to the first connection rod via the ball head, and a slot. The at least one transmission includes a gear shaft, a first ring gear, a first pinion, a second ring gear, a second pinion, and a shaft pin.

3 Claims, 14 Drawing Sheets

(56) References Cited

U.S. PATENT DOCUMENTS

| | | | | |
|---|---|---|---|---|
| 5,074,176 A | * | 12/1991 | Redman | B23B 31/1269 |
| | | | | 82/165 |
| 5,160,110 A | * | 11/1992 | Praegitzer | A47G 33/1213 |
| | | | | 248/523 |
| 5,785,325 A | * | 7/1998 | Daetwyler | B23B 31/1276 |
| | | | | 279/106 |
| 5,918,849 A | * | 7/1999 | Bliss | A47G 33/1213 |
| | | | | 248/523 |
| 7,810,419 B2 | * | 10/2010 | Rundell | B26D 7/02 |
| | | | | 83/459 |

* cited by examiner

DEVICE FOR FIXING CYLINDER

CROSS-REFERENCE TO RELAYED APPLICATIONS

Pursuant to 35 U.S.C. § 119 and the Paris Convention Treaty, this application claims foreign priority to Chinese Patent Application No. 202010204557.2 filed Mar. 21, 2020, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a device for fixing a cylinder.

SUMMARY

The disclosure provides a device for fixing a cylinder, the device comprising a first outer casing; a rotatable inner casing comprising a first protrusion; a second outer casing; a plurality of curved blades; and at least one transmission.

The second outer casing is in threaded connection to the first outer casing, and comprises a first bearing, a second bearing, a third bearing, a first division plate comprising a first through hole and a first arc groove, and a second division plate comprising a second through hole and a second arc groove.

Each curved blade comprises a first connection rod having a ball head, a second connection rod pivotally connected to the first connection rod via the ball head, and a slot disposed on one end of the second connection rod.

The at least one transmission comprises a gear shaft, a first ring gear, a first pinion engaged with the first ring gear, a second ring gear, a second pinion engaged with the second ring gear, and a shaft pin directly connected to the second ring gear.

The third bearing, the second bearing, the second division plate, a plurality of curved blades, the first division plate, the first bearing, and the rotatable inner casing are disposed successively on the second outer casing from bottom up; the second bearing comprises an inner ring and an outer ring; the second outer casing further comprises a second protrusion and a third protrusion; the inner ring is fixedly connected to the second protrusion, and the outer ring is fixedly connected to the second ring gear.

The second division plate comprises a rim fixedly connected to the third protrusion via a first bolt; the first division plate comprises a side part fixedly connected to the second outer casing via a second bolt; the rotatable inner casing comprises a lower end; the first bearing is disposed in an inner side of the lower end over the first division plate.

The first ring gear is fixedly connected to the first protrusion of the rotatable inner casing via a third bolt; the plurality of curved blades is disposed between the first division plate and the second division plate; each curved blade comprises an upper surface provided with a first lug disposed in the first arc groove on a lower surface of the first division plate, and a lower surface provided with a second luge disposed in the second arc groove on an upper surface of the second division plate.

The plurality of curved blades each comprises a curved surface coated with rubber material; the second division plate further comprises a first strip hole; the shaft pin comprises a third connection rod; the second connection rod passes through the first strip hole of the second division plate, and the third connection rod is fixedly disposed in the slot on the one end of the second connection rod.

The second pinion is disposed below the gear shaft and supported by the third bearing, and the first pinion is disposed over the gear shaft; the gear shaft passes through the first division plate via the first through hole and the second division plate via the second through hole; two ends of the gear shaft are engaged with the first pinion and the second pinion, respectively; the second ring gear comprises a ungeared segment and a gear segment; the second pinion is engaged with the gear segment; the shaft pin is opposite to the ungeared segment; the shaft pin further comprises a rotary pin and a limit rod; the second outer casing further comprises an inner end face provided with a second strip hole; one end of the shaft pin is rotatably connected to the second ring gear via the rotary pin; and another end of the shaft pin is fixed in the second strip hole via the limit rod.

The device comprises four curved blades and four transmissions cooperating with the four curved blades, respectively.

The second outer casing can be provided with a suspension loop on a lower end thereof.

In the drawings, the following number references are used: 1. First outer casing; 2. Rotatable inner casing; 2a. First ring gear 2b. First pinion; 2c. First protrusion; 3. First division plate; 3a. First through hole; 3b. First arc groove; 4. Curved blade; 4a. Second connection rod; 4b. First connection rod; 4c. Slot; 4d. First lug; 4e. Second lug; 5. Second division plate; 5a. First strip hole; 5b. Second through hole; 5c. Second arc groove; 6. Second outer casing; 6a. Second strip hole; 6b. Suspension loop; 6c. Third protrusion; 6d. Second protrusion; 7. Second ring gear; 7a. Shaft pin; 7a1. Third connection rod; 7a2. Limit rod; 7a3. Rotary pin; 7b.

Second pinion; 7c. Ungeared segment; 7d. Gear segment; 8. First bearing; 9. Second bearing; 10. Third bearing; 11. Gear shaft; 12. Third bolt; 13. Second bolt; 14. First bolt.

DETAILED DESCRIPTION

To further illustrate, embodiments detailing a device for fixing a cylinder are described below. It should be noted that the following embodiments are intended to describe and not to limit the disclosure.

Figure 1:
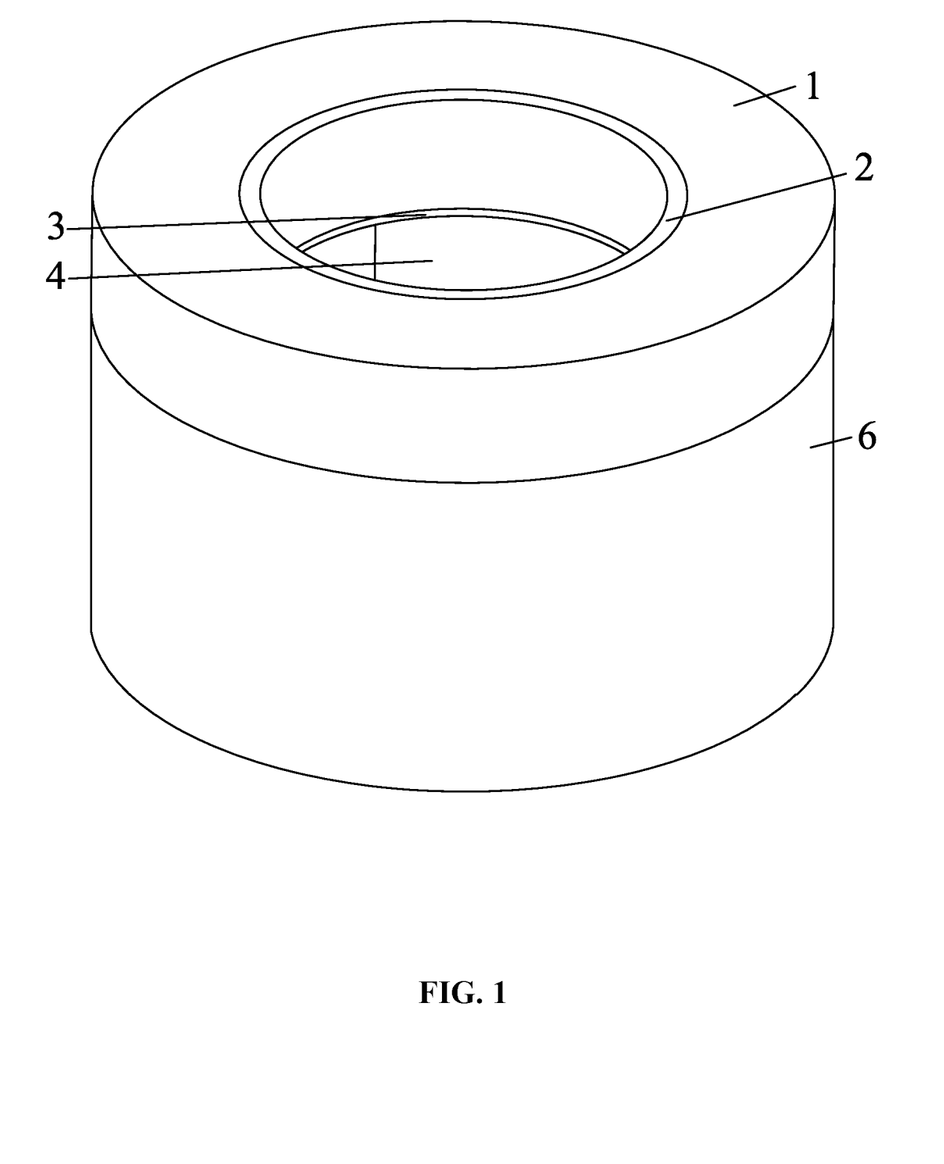
FIG. 1 is a schematic diagram of a device for fixing a cylinder according to one embodiment of the disclosure.
Figure 2:
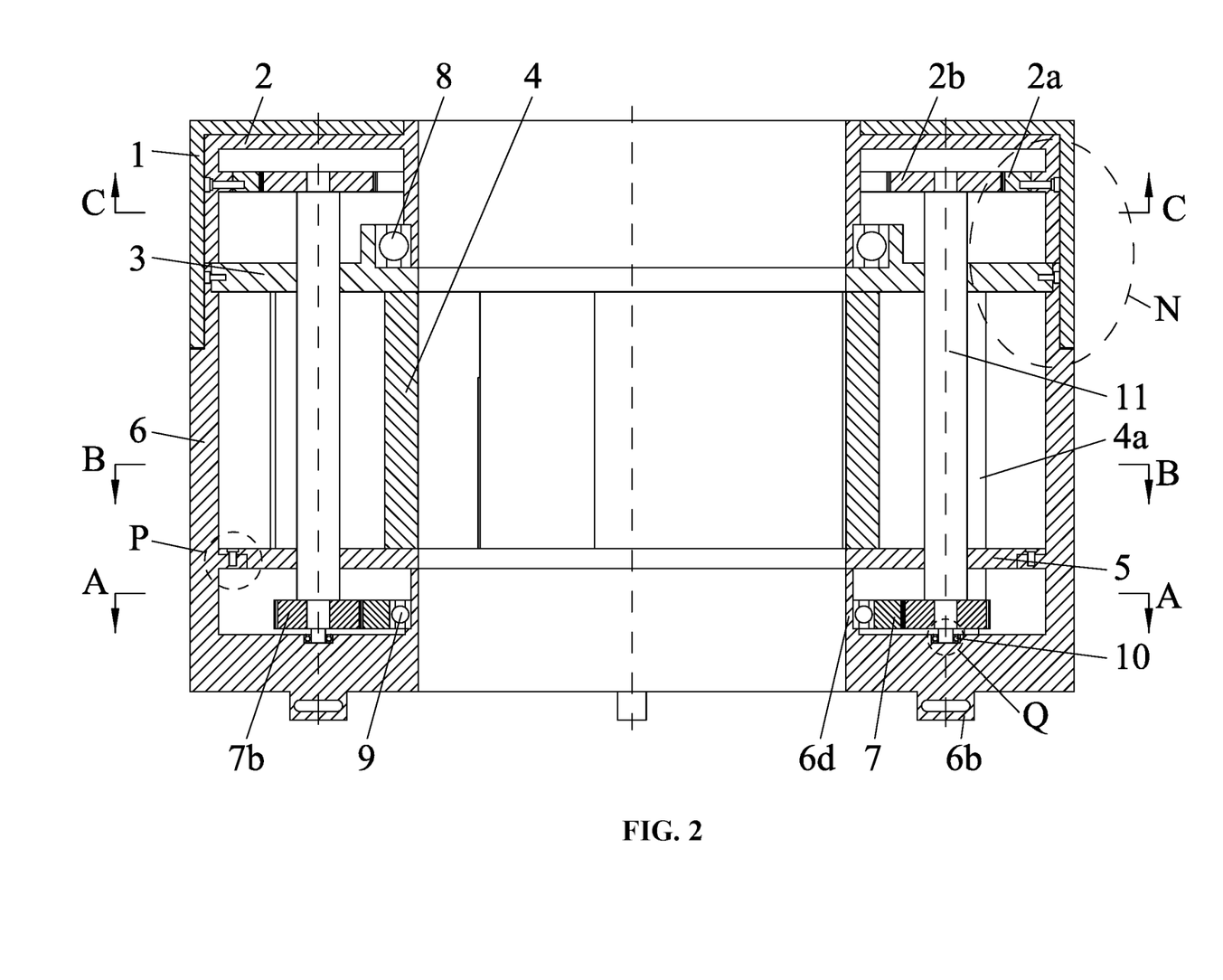
FIG. 2 is a sectional view of a device for fixing a cylinder according to one embodiment of the disclosure (taken from line D-D in FIG. 3)
Figure 9:
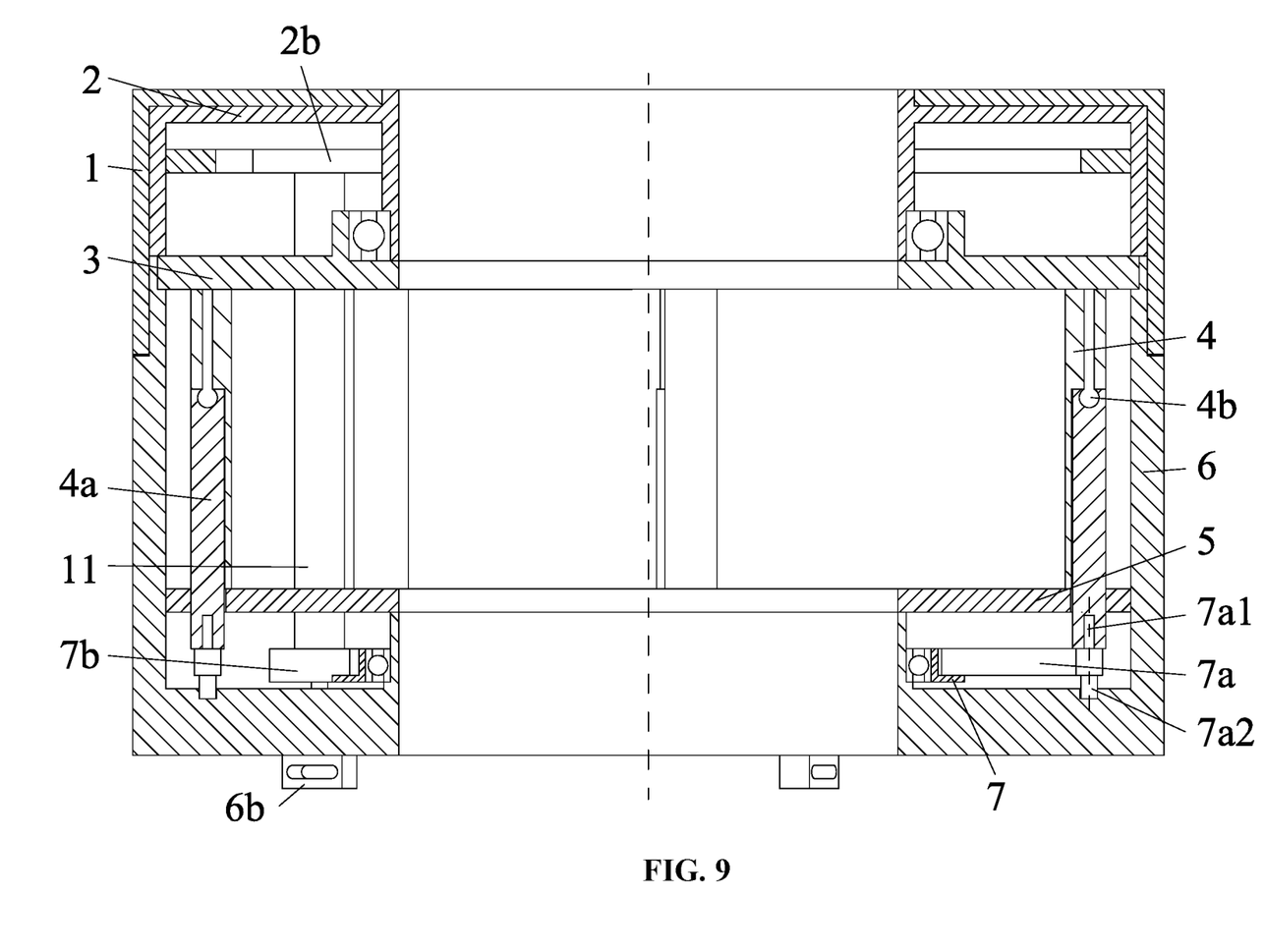
FIG. 9 is a sectional view taken from line M-M in FIG. 4 according to one embodiment of the disclosure.
Figure 10:
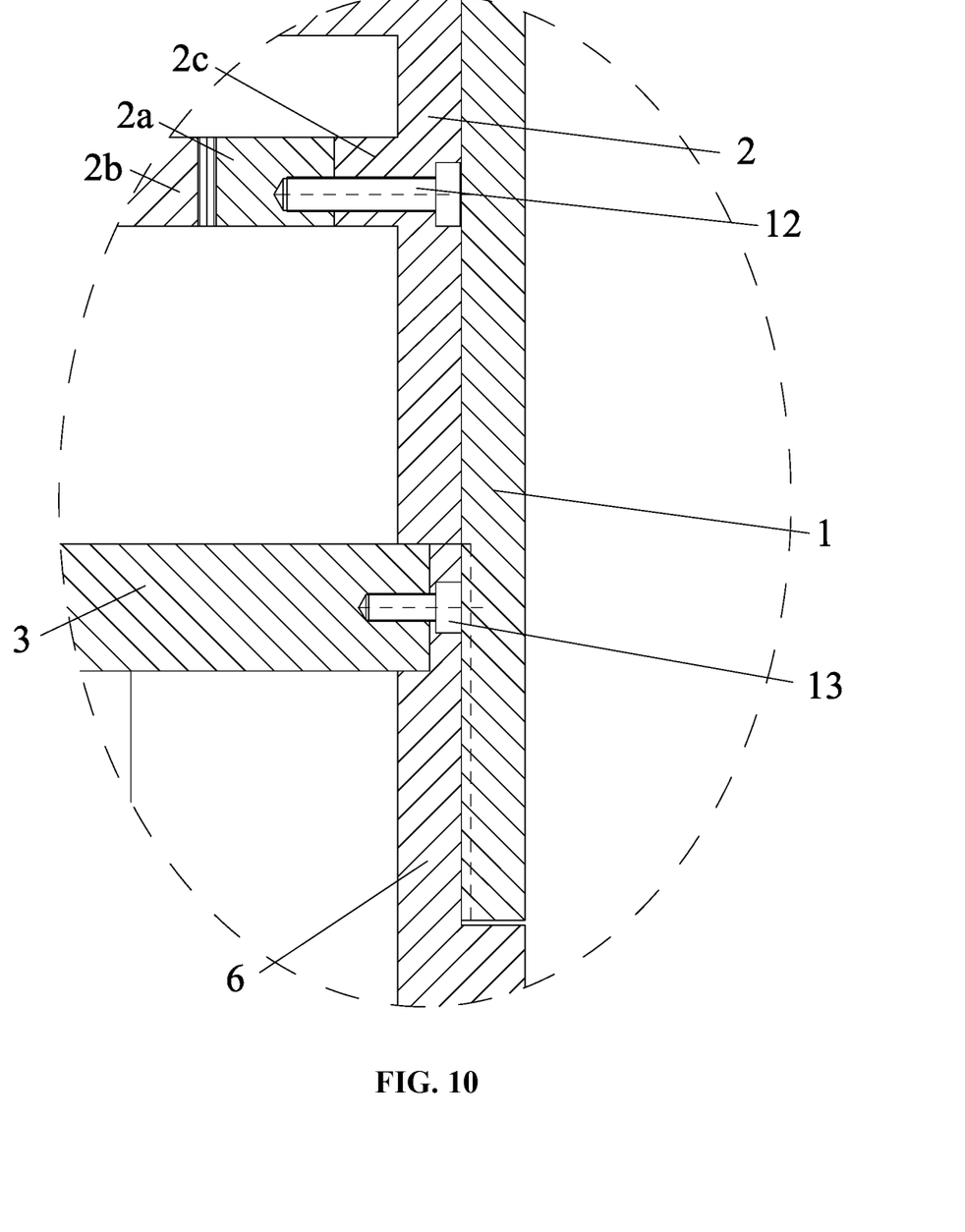
FIG. 10 is a local enlarged view of part N in FIG. 2.
Figure 11:
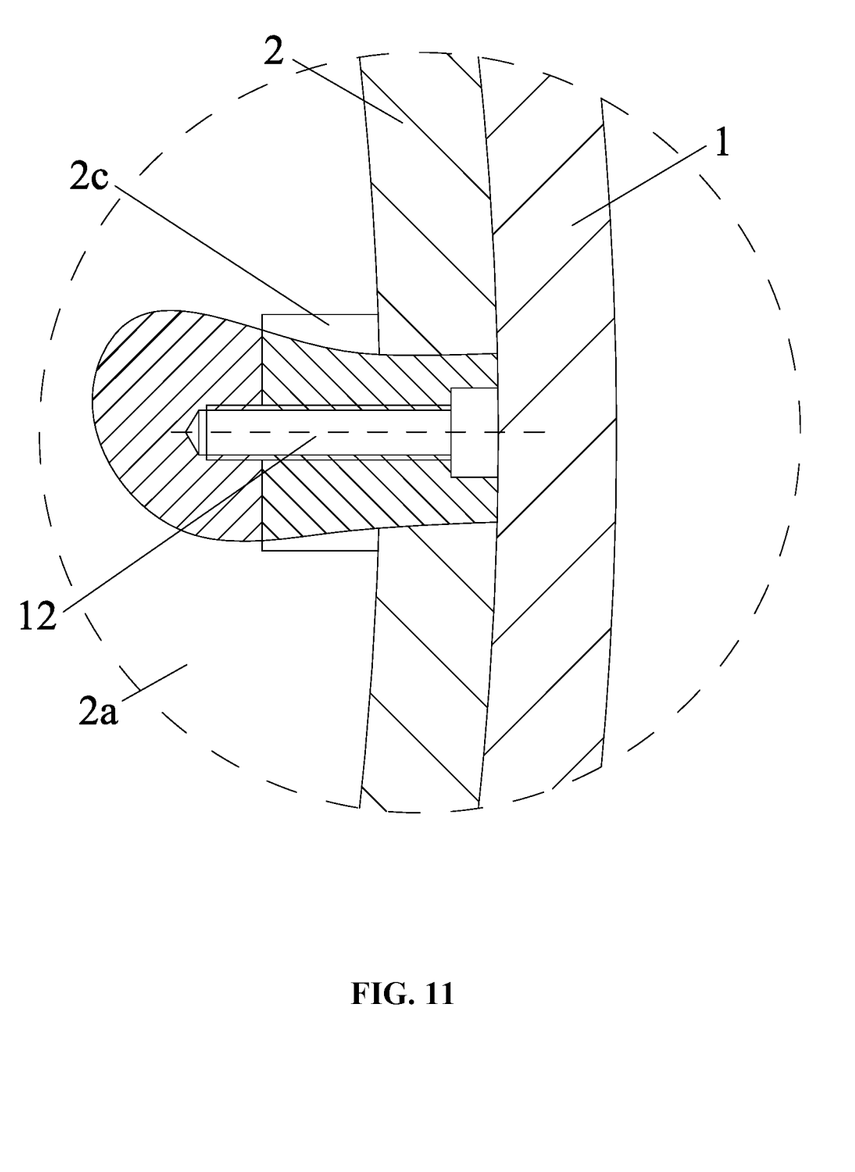
FIG. 11 is a local enlarged view of part O in FIG. 6.
Figure 12:
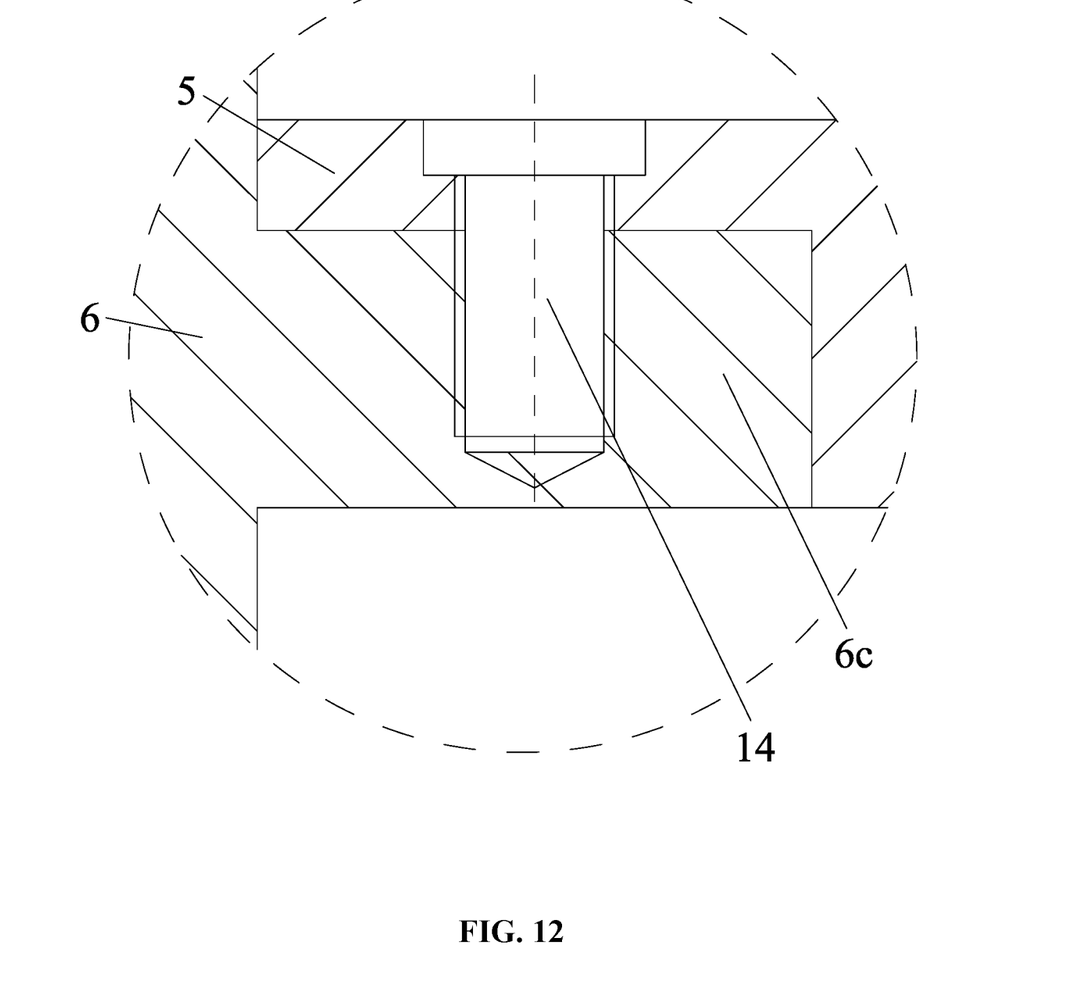
FIG. 12 is a local enlarged view of part P in FIG. 2.
Figure 13:
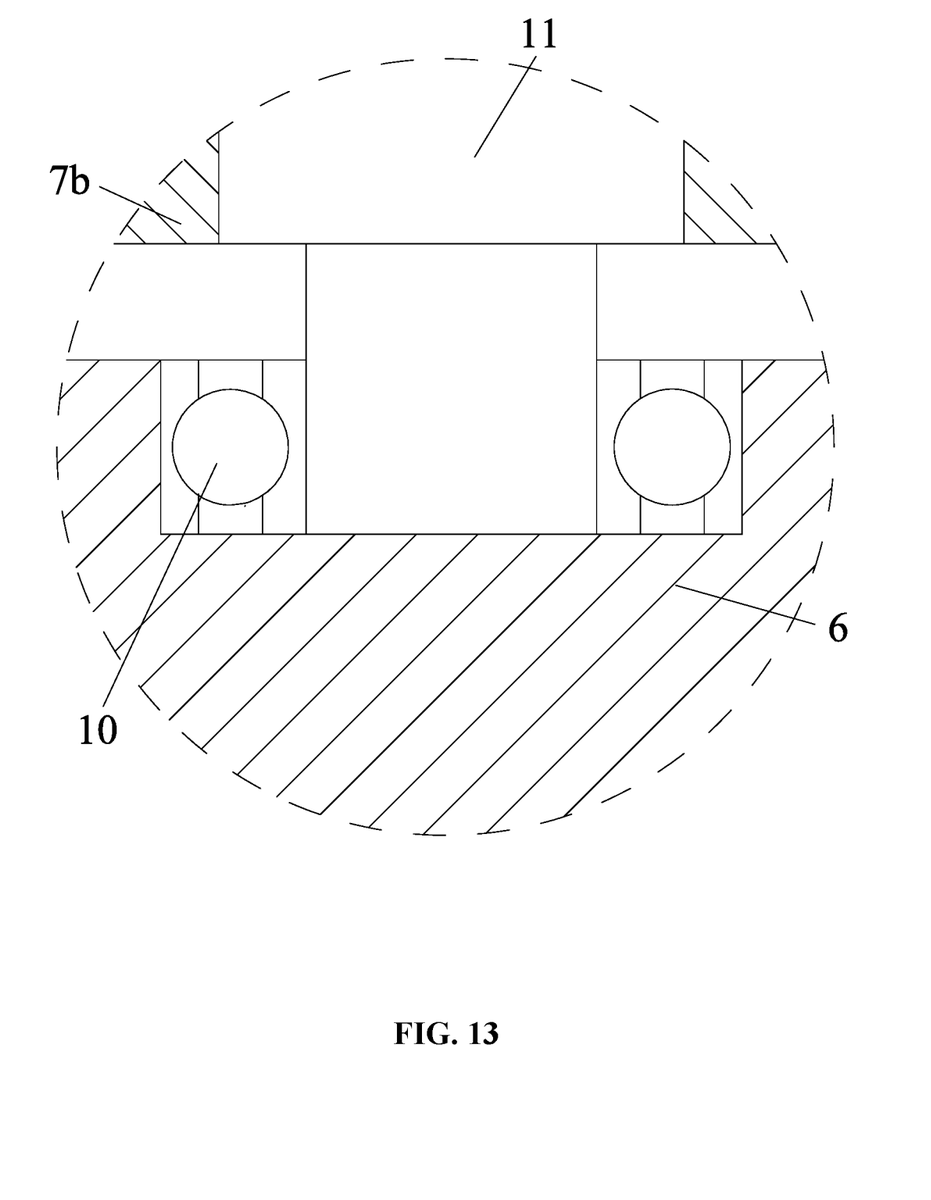
FIG. 13 is a local enlarged view of part Q in FIG. 2.
Figure 14:
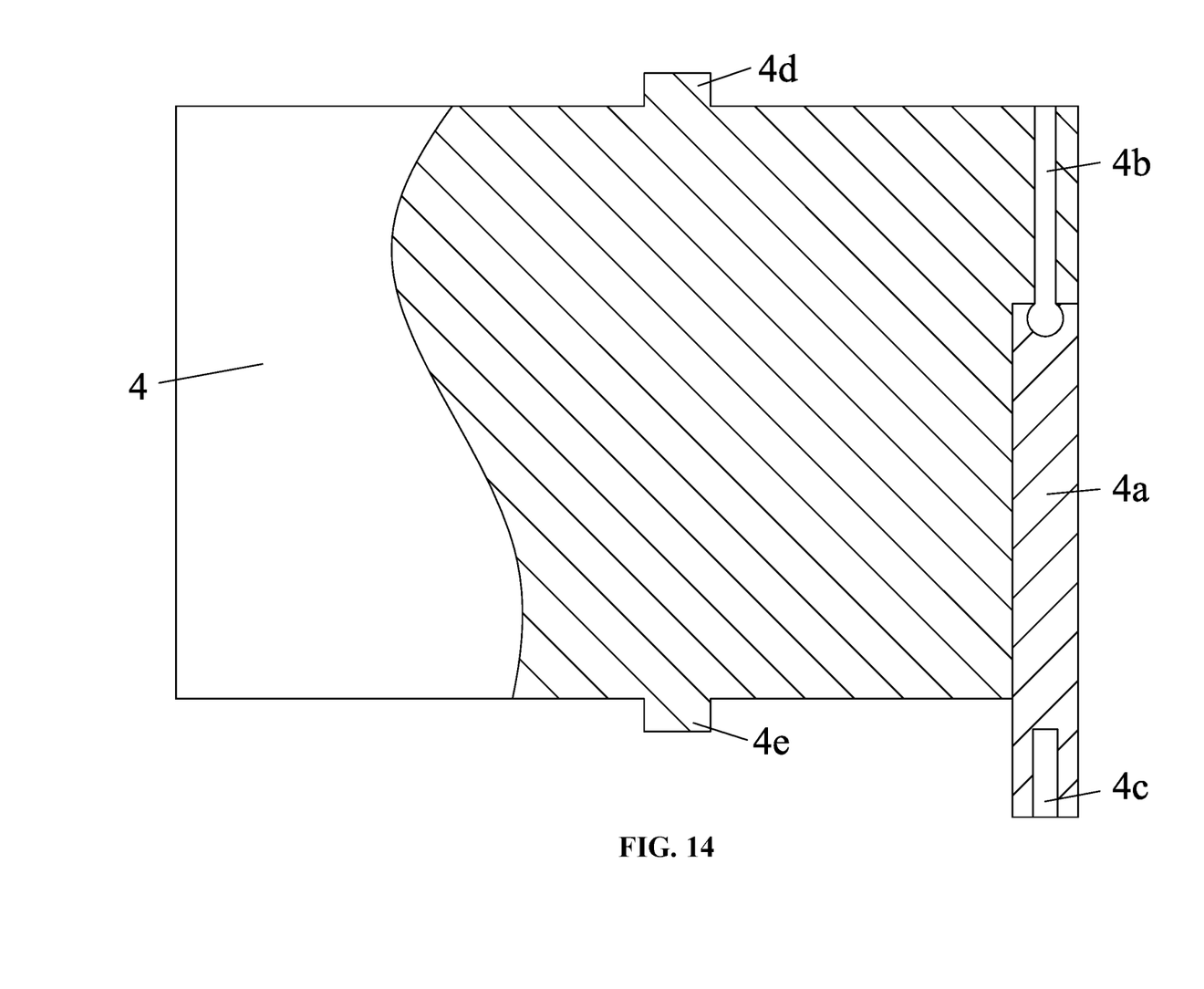
FIG. 14 is a partial section of a curved blade according to one embodiment of the disclosure.

As shown in FIGS. 1-14, provided is a device for fixing a cylinder. Specifically, as shown in FIGS. 1, 2 and 9, the device comprises a first outer casing 1, a rotatable inner casing 2 comprising a first protrusion 2c, a second outer casing 6, a plurality of curved blades 4, and at least one transmission. The second outer casing is in threaded connection to the first outer casing, and comprises a first bearing 8, a second bearing 9, a third bearing 10, a first division plate 3 comprising a first through hole 3a and a first arc groove 3b, and a second division plate 5 comprising a second through hole 5b and a second arc groove 5c. The third bearing 10, the second bearing 9, the second division plate 5, the plurality of curved blades 4, the first division plate 3, the first bearing 8, and the rotatable inner casing 2 are disposed successively on the second outer casing 6 from bottom up. The second bearing 9 comprises an inner ring and an outer ring; the second outer casing 6 further comprises a second protrusion 6d and a third protrusion 6c; the inner ring is fixedly connected to the second protrusion 6d, and the outer ring is fixedly connected to the second ring gear 7. The second division plate 5 comprises a rim fixedly connected to the third protrusion 6c via a first bolt 14; the first division plate 3 comprises a side part fixedly connected to the second outer casing via a second bolt 13; the rotatable inner casing 2 comprises a lower end; the first bearing 8 is disposed in an inner side of the lower end on the first division plate 3; the first ring gear 2a is fixedly connected to the first protrusion 2c of the rotatable inner casing 2 via a third bolt 12. The first outer casing 1 comprises internal thread, and the rotatable inner casing 2 is flexibly nested in the first outer casing 1. Thus, the first outer casing 1 and the rotatable inner casing 2 are a detachable structure from the entire device.

As shown in FIGS. 7, 8, 9, and 14, four curved blades 4 are disposed between the first division plate 3 and the second division plate 5. Each curved blade comprises an upper surface provided with a first lug 4d disposed in the first arc groove 3b on a lower surface of the first division plate 3, and a lower surface provided with a second lug 4e disposed in the second arc groove 5c on an upper surface of the second division plate 5. The four curved blades 4 each comprises a curved surface coated with rubber material. Each curved blade comprises a first connection rod 4b having a ball head, a second connection rod 4a pivotally connected to the first connection rod 4b via the ball head, and a slot 4c disposed on one end of the second connection rod 4a. The second division plate 5 further comprises a first strip hole 5a; the shaft pin 7a comprises a third connection rod 7a1; the second connection rod 4a passes through the first strip hole 5a of the second division plate 5, and the third connection rod 7a1 is fixedly disposed in the slot 4c on the one end of the second connection rod 4a.

As shown in FIG. 2, the transmission comprises four gear shafts 11, a first ring gear 2a, a first pinion 2b engaged with the first ring gear 2a, a second ring gear 7, a second pinion 7b engaged with the second ring gear 7, and a shaft pin 7a directly connected to the second ring gear 7. The second pinion 7b is disposed on a lower end of the gear shaft 11 and supported by the third bearing 10, and the first pinion 2b is disposed over the gear shaft 11. The gear shaft 11 passes through the first division plate 3 via the first through hole 3a and the second division plate 5 via the second through hole 5b. Two ends of the gear shaft 11 are engaged with the first pinion 2b and the second pinion 7b, respectively.

Figure 3:
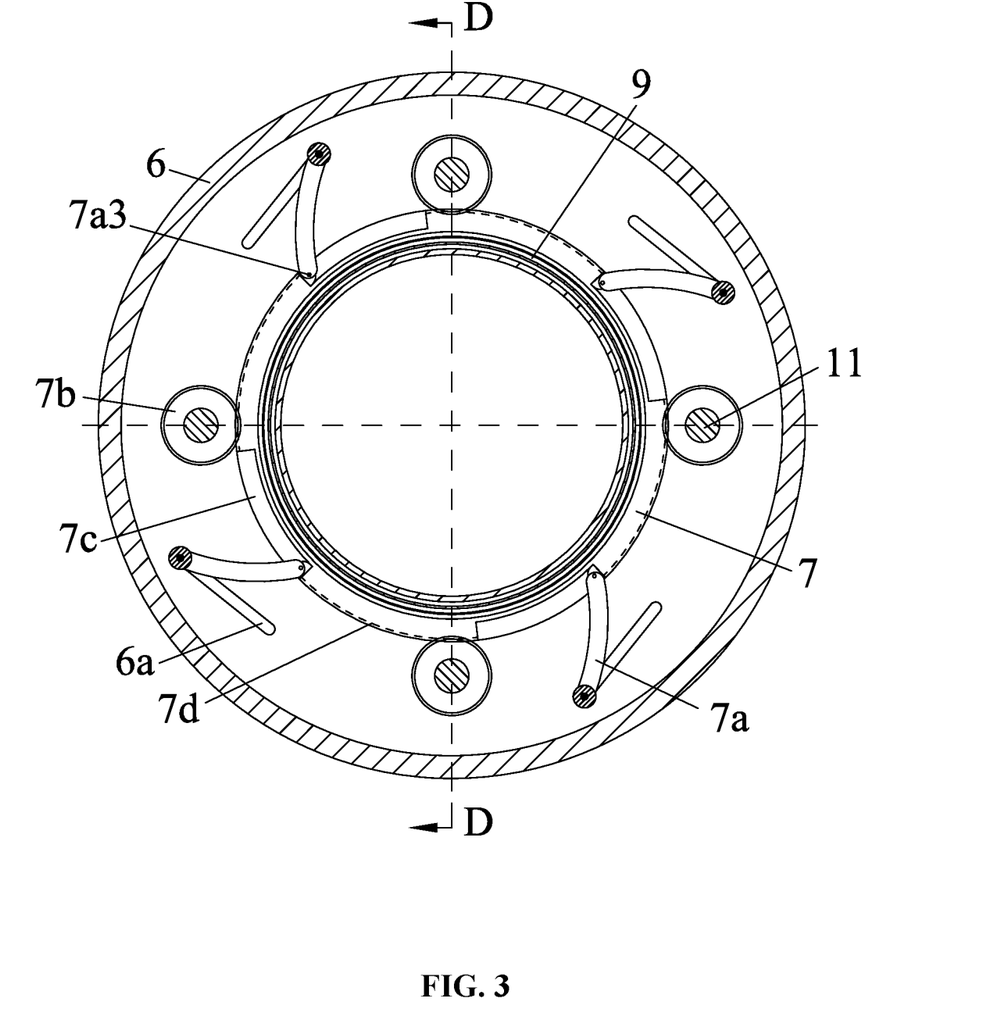
FIG. 3 is a sectional view of a device for fixing a cylinder taken from line A-A in FIG. 2 according to one embodiment of the disclosure.

As shown in FIG. 3, the second ring gear 7 comprises four ungeared segments 7c and four gear segments 7d which are alternately disposed; the second pinion 7b is engaged with the gear segment 7d; the shaft pin 7a faces the ungeared segment 7c; the shaft pin 7a further comprises a rotary pin 7a3 and a limit rod 7a2; the second outer casing 6 further comprises an inner end face provided with a second strip hole 6a; one end of the shaft pin 7a is rotatably connected to the second ring gear 7 via the rotary pin 7a3. The ungeared segment 7c can prevent the rotation of the shaft pin 7a from obstructing the second ring gear 7. The other end of the shaft pin 7a is restricted in the second strip hole 6a via the limit rod 7a2.

Figure 4:
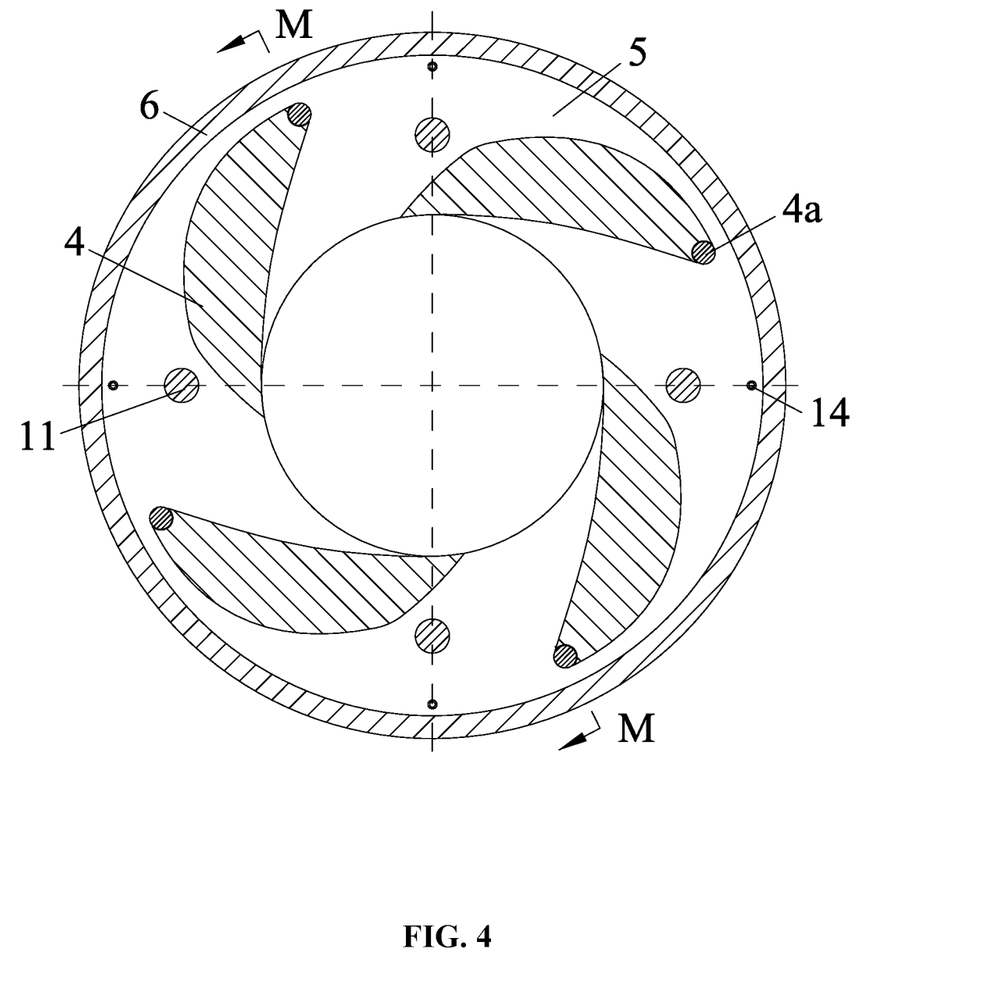
FIG. 4 is a sectional view of a plurality of curved blades in a relax state taken from line B-B in FIG. 2 according to one embodiment of the disclosure.
Figure 5:
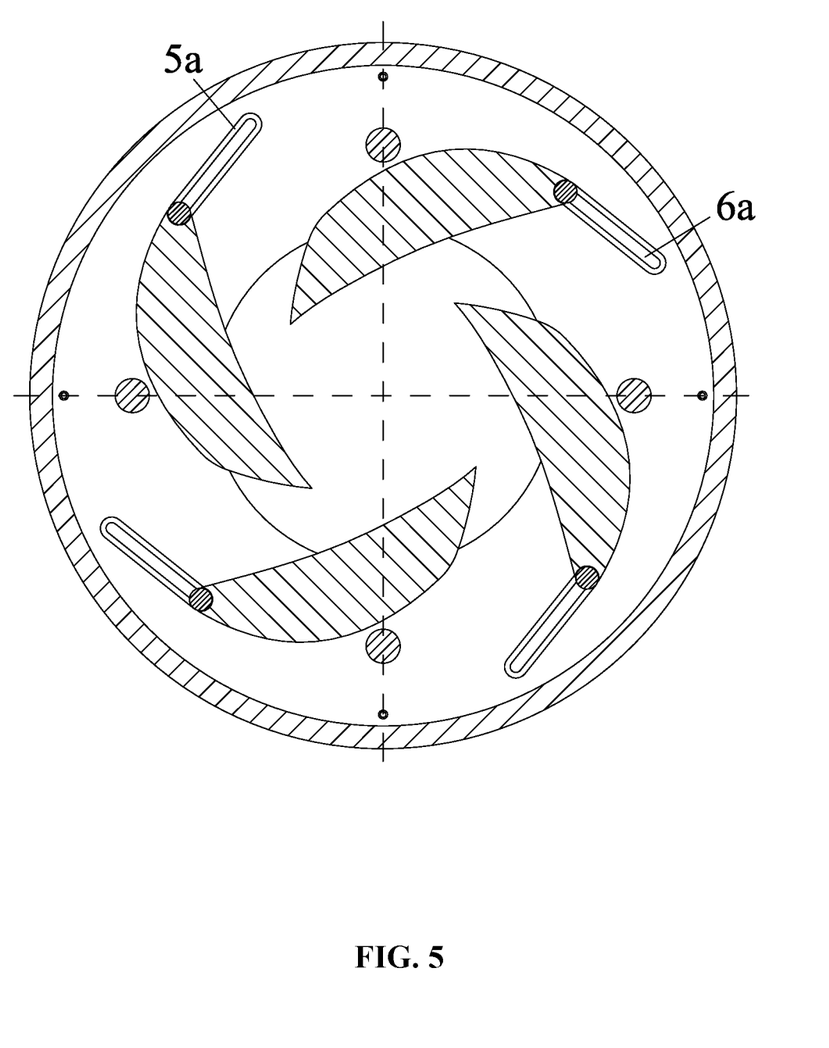
FIG. 5 is a sectional view of a plurality of curved blades in a tensed state taken from line B-B in FIG. 2 according to one embodiment of the disclosure.
Figure 6:
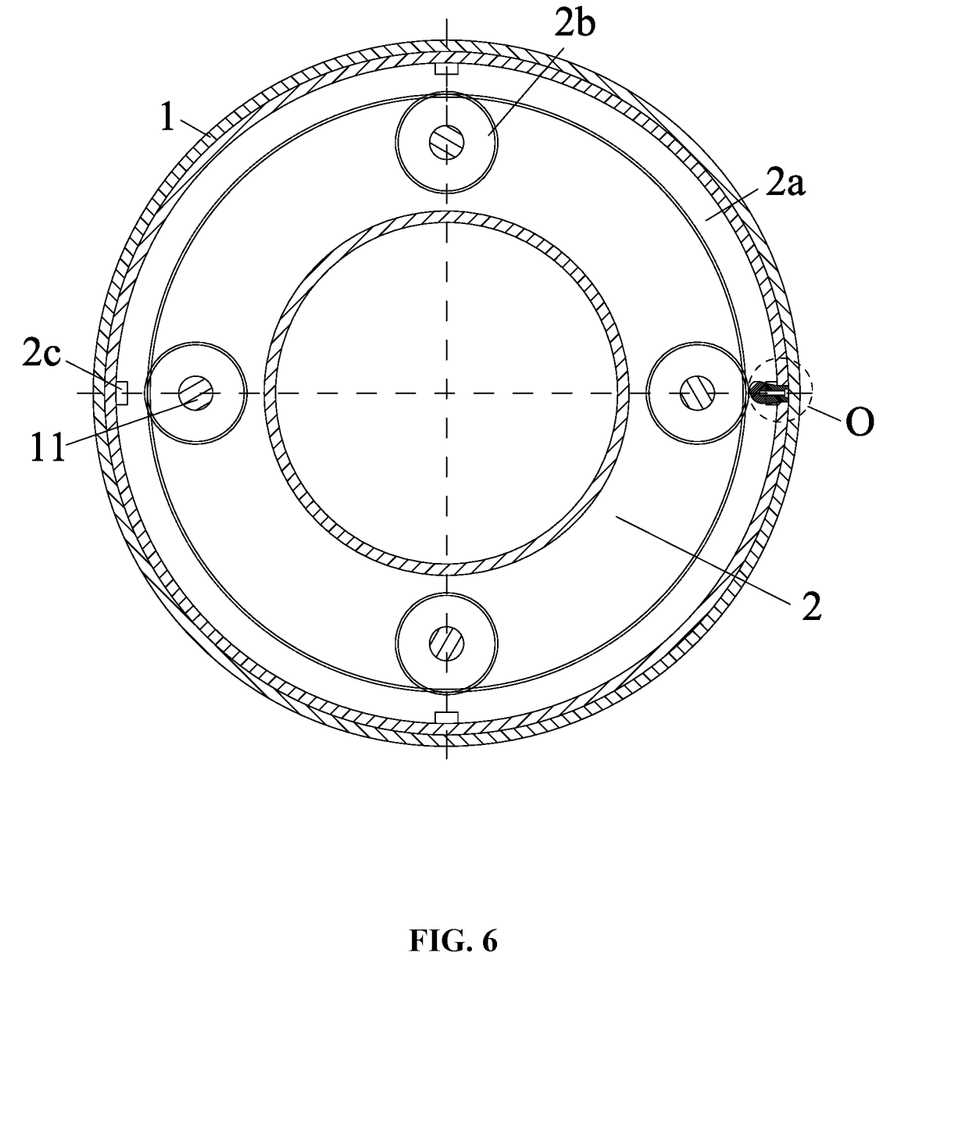
FIG. 6 is a sectional view of a device for fixing a cylinder taken from line C-C in FIG. 2 according to one embodiment of the disclosure.
Figure 7:
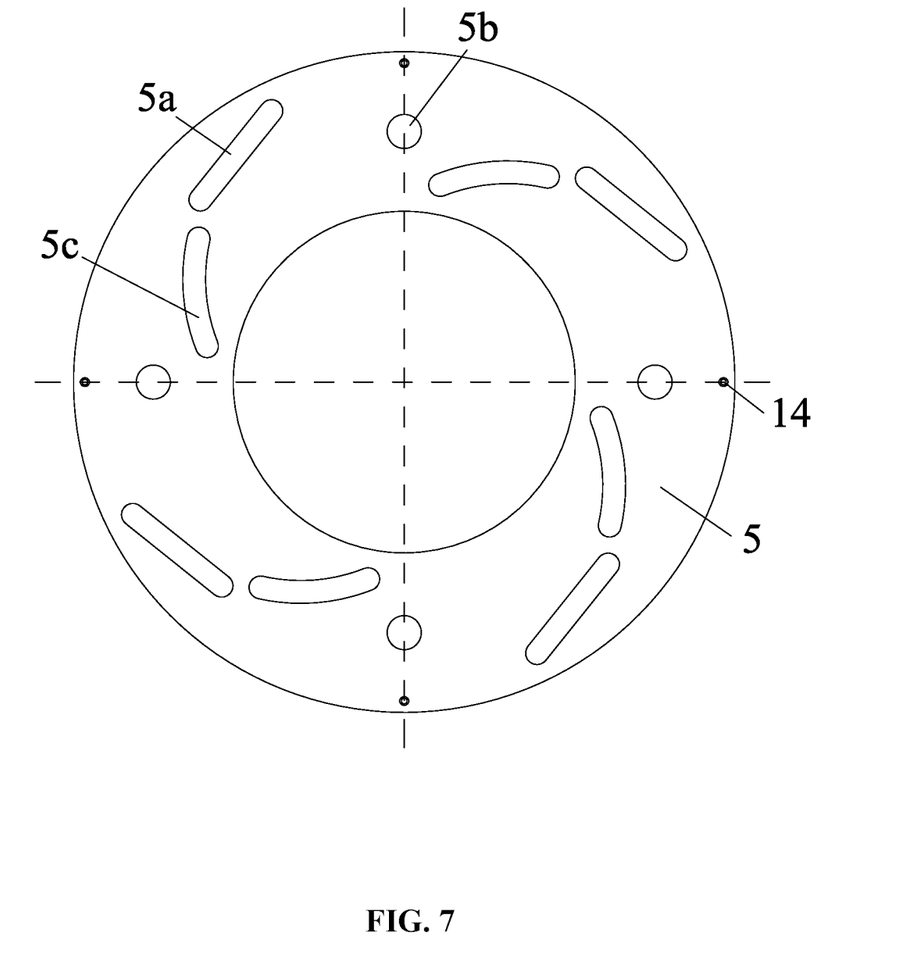
FIG. 7 is a bottom view of a second division plate according to one embodiment of the disclosure.
Figure 8:
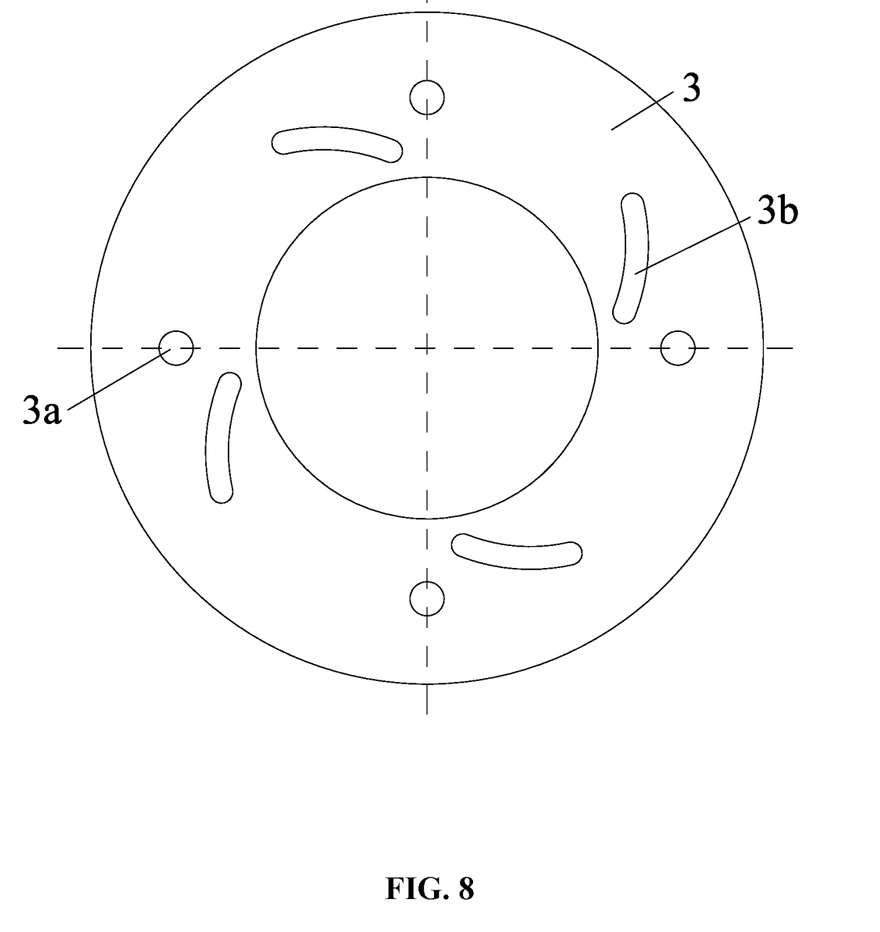
FIG. 8 is a top view of a first division plate according to one embodiment of the disclosure.

The operation of the device of the disclosure is described as follows. As shown in FIG. 1, initially, a cylindrical structure passes through the center of the device. The first outer casing 1 is screwed out from the second outer casing 6, thus unlocking the device. The second outer casing 6 is manually immobilized. When the rotatable inner casing 2 rotates, the first ring gear 2a fixedly connected to the rotatable inner casing 2 is driven to rotate, and then the first pinion 2b engaged with the first ring gear 2a rotates. The rotation of the first pinion 2b is transmitted by the gear shaft 11 to the second pinion 7b. The rotation of the second pinion 7b drives the second ring gear 7 engaged with the second pinion 7b to rotate. Thus, the coupling end of the shaft pin 7a rotates around the rotary pin 7a3 to adjust the included angle between the shaft pin 7a and the second ring gear 7. The movable end of the shaft pin 7a moves linearly in the second strip hole 6a. As shown in FIGS. 4 and 5, the first connection rod 4b pivotally connected to the second connection rod 4a moves linearly along the same track as the shaft pin 7a under the restriction of the first strip hole 5a and the second strip hole 6a. Limited by the first arc groove 3b and the second arc groove 5c, the plurality of curved blades 4 is driven by the first connection rod 4b to rotate relative to the second connection rod 4a. The plurality of curved blades 4 rotates to produce the centrifugal effect and encircles the outer surface of the cylindrical structure. Halt the rotation of the rotatable inner casing 2, and under the action of the friction and systematic damping, the curved blades 4 remains clamped tightly. The first outer casing 1 is secured to the rotatable inner casing 2 and contacts the second outer casing 6, and the first outer casing 1 is tightly screwed on the second outer casing 6. The tightening direction of the first outer casing 1 is the same as the rotation direction of the rotatable inner casing, thus ensuring the plurality of curved blades 4 does not loosen and release the cylindrical structure. In the locking state, the inner wall of the first outer casing 1 is tightly attached to and presses the rotatable inner casing 2, so that the first outer casing 1, the rotatable inner casing 2 and the second outer casing 6 are tightly attached and fixed, thus locking the device and preventing the relative rotation of the device. Thus, in the working state, the plurality of curved blades 4 can always clamp the cylindrical structure, achieving the locking function.

The device is designed mainly for fixing cylindrical structures, and provides fixed support for equipment, instruments or devices that need to be fixed on the surface of cylindrical structure. The device comprises a plurality of curved blades capable of embracing the outer surface of the cylindrical structure. In addition, the curved blades are coated with a certain thickness of friction elastic material, which can fit the cylindrical surface and provide fixation support and protection for the surface of the cylindrical structure. The second outer casing comprises a suspension loop which can be used for the hanging or installation of the testing instrument, improving the firmness, stability and applicability of the arrangement of the instrument. The device is a mechanical structure, without electrical system, and thus has wide application range, lower manufacturing, use and maintenance costs. The device can adapt to the diameter change of the cylindrical structure.

It will be obvious to those skilled in the art that changes and modifications may be made, and therefore, the aim in the appended claims is to cover all such changes and modifications.

What is claimed is:

1. A device, comprising:
   a first outer casing;
   a rotatable inner casing comprising a first protrusion;
   a second outer casing, the second outer casing being in threaded connection to the first outer casing, and comprising a first bearing, a second bearing, a third bearing, a first division plate comprising a first through hole and a first arc groove, and a second division plate comprising a second through hole and a second arc groove;
   a plurality of curved blades, each curved blade comprising a first connection rod having a ball head, a second connection rod pivotally connected to the first connection rod via the ball head, and a slot disposed on one end of the second connection rod; and
   at least one transmission, the at least one transmission comprising a gear shaft, a first ring gear, a first pinion engaged with the first ring gear, a second ring gear, a second pinion engaged with the second ring gear, and a shaft pin directly connected to the second ring gear;
   wherein:
   the third bearing, the second bearing, the second division plate, the plurality of curved blades, the first division plate, the first bearing, and the rotatable inner casing are disposed successively on the second outer casing from bottom up;
   the second bearing comprises an inner ring and an outer ring; the second outer casing further comprises a second protrusion and a third protrusion; the inner ring is fixedly connected to the second protrusion, and the outer ring is fixedly connected to the second ring gear;
   the second division plate comprises a rim fixedly connected to the third protrusion via a first bolt;
   the first division plate comprises a side part fixedly connected to the second outer casing via a second bolt;
   the rotatable inner casing comprises a lower end; the first bearing is disposed in an inner side of the lower end on the first division plate;
   the first ring gear is fixedly connected to the first protrusion of the rotatable inner casing via a third bolt;
   the plurality of curved blades is disposed between the first division plate and the second division plate; each curved blade comprises an upper surface provided with a first lug disposed in the first arc groove on a lower surface of the first division plate, and a lower surface provided with a second lug disposed in the second arc groove on an upper surface of the second division plate;
   the plurality of curved blades each comprises a curved surface coated with rubber material;
   the second division plate further comprises a first strip hole; the shaft pin comprises a third connection rod; the second connection rod passes through the first strip hole of the second division plate, and the third connection rod is fixedly disposed in the slot on the one end of the second connection rod;
   the second pinion is disposed below the gear shaft and supported by the third bearing, and the first pinion is disposed over the gear shaft;
   the gear shaft passes through the first division plate via the first through hole and the second division plate via the second through hole; two ends of the gear shaft are engaged with the first pinion and the second pinion, respectively; the second ring gear comprises a ungeared segment and a gear segment; the second pinion is engaged with the gear segment; the shaft pin is opposite to the ungeared segment; the shaft pin further comprises a rotary pin and a limit rod; the second outer casing further comprises an inner end face provided with a second strip hole; one end of the shaft pin is rotatably connected to the second ring gear via the rotary pin; and another end of the shaft pin is fixed in the second strip hole via the limit rod.

2. The device of claim 1, wherein the device comprises four curved blades and four transmissions cooperating with the four curved blades, respectively.

3. The device of claim 1, wherein the second outer casing is provided with a suspension loop on a lower end thereof.

* * * * *